No. 724,568. PATENTED APR. 7, 1903.
W. N. GOURLEY.
DIE FOR WELDING LINKS.
APPLICATION FILED JAN. 9, 1903.
NO MODEL.
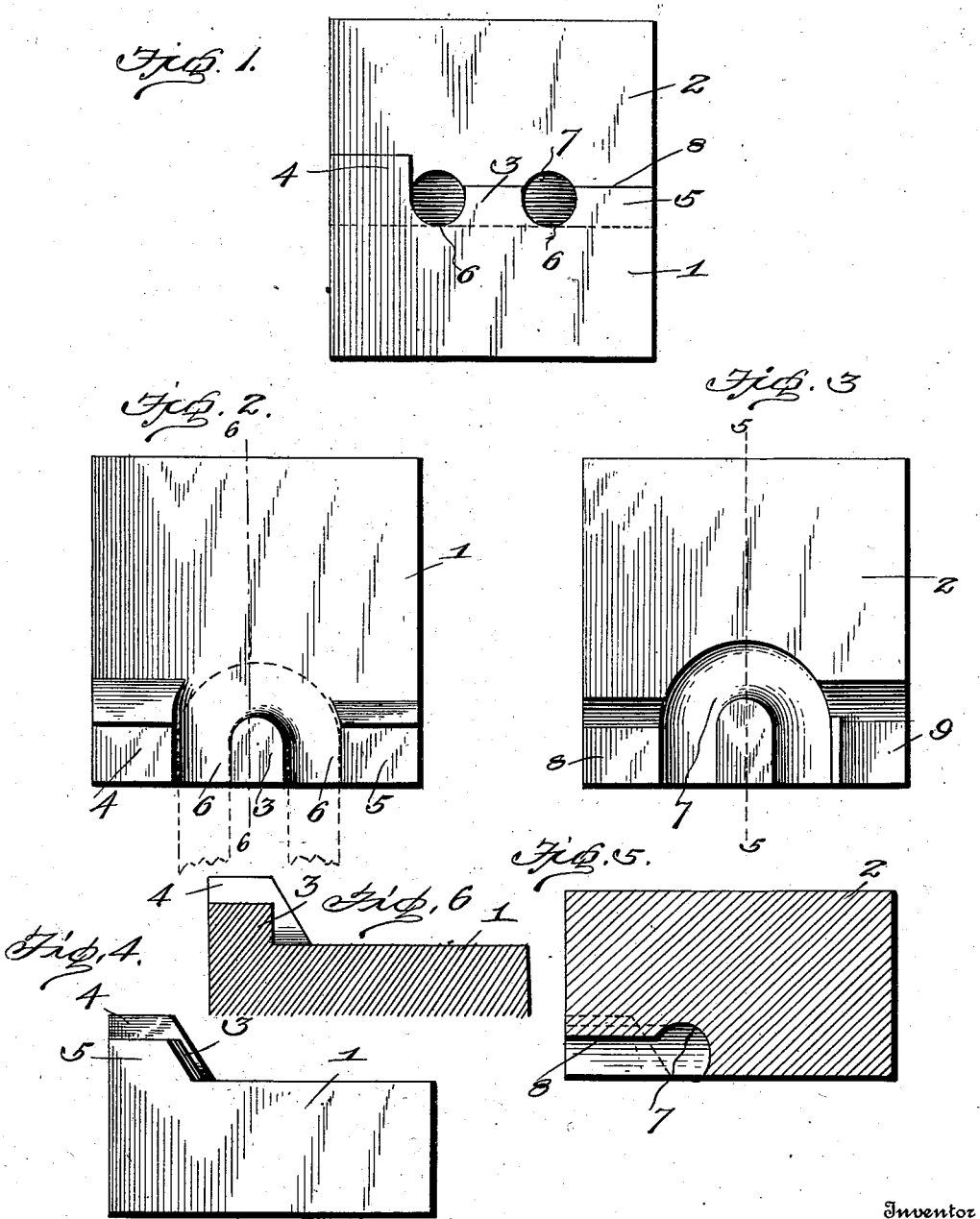

UNITED STATES PATENT OFFICE.

WILLIAM N. GOURLEY, OF COLUMBUS, OHIO.

DIE FOR WELDING LINKS.

SPECIFICATION forming part of Letters Patent No. 724,568, dated April 7, 1903.

Application filed January 9, 1903. Serial No. 138,390. (No model.)

*To all whom it may concern:*

Be it known that I, WILLIAM N. GOURLEY, a citizen of the United States, residing at Columbus, in the county of Franklin and State of Ohio, have invented certain new and useful Improvements in Dies for Welding Links; and I do declare the following to be a full, clear, and exact description of the invention, such as will enable others skilled in the art to which it appertains to make and use the same.

This invention relates to dies for welding links for chains and other purposes.

The object of the present invention is to improve the construction shown in the patent granted to me numbered 713,427 and issued November 11, 1902, the form of die shown in this patent being more particularly adapted for use with hammers giving a direct vertical blow, while in the present invention it is designed to construct a die more particularly adapted for use with a hammer giving a push or slanting blow, a further object being to construct a die in which the link will be welded and smoothly finished alike on the inside and outside thereof.

With these and other objects in view the invention consists in the construction and arrangement of the parts, as will be hereinafter more fully described and claimed, reference being had to the accompanying drawings, in which—

Figure 1 is a front elevation of the two die members in the position they would assume at the end of a stroke. Fig. 2 is a top plan view of the lower or anvil die member, showing in broken lines a link in position. Fig. 3 is a similar view of the lower face of the upper or hammer die. Fig. 4 is a side elevation of the anvil-die. Fig. 5 is a vertical sectional view of the hammer-die on the line 5 5 of Fig. 3. Fig. 6 is a section through the anvil-die on line 6 6 of Fig. 2.

In the drawings, 1 denotes the lower or anvil die, and 2 denotes the upper or hammer die. On the upper face of the lower or anvil die, adjacent to the forward edge of the same and disposed centrally thereto, is formed a welding pin or core 3, which corresponds in shape with the inside of one end of the link to be welded. At each side of the welding-pin 3 are arranged guide or holding lugs 4 and 5, the lug 5 being the same height as the pin 3, while the lug 4 is of somewhat greater height.

Between the pin 3 and the lugs 4 and 5 are formed channels or grooves 6, in which the sides of the link are adapted to lie when placed around the welding pin or core 3, the said pin or core being of a height approximately two-thirds of the thickness of the metal used in the formation of the link.

In the lower face of the hammer-die is formed a U-shaped groove or depression 7, and the forward end of said lower face is cut away, as shown at 8, to adapt the same to conform to the shape of the upper face and lugs of the anvil-die. A depression 9 is formed adjacent to one side of the groove 7, which is adapted to engage or to receive the lug 4 on the anvil-die. By cutting away the forward portion of the hammer-die face, as at 8, it will be seen that the sides of the groove 7 are made comparatively shallow, while the thicker portion of the die forms a wall at the inner or loop end of the groove, which is approximately as deep as the thickness of the metal forming the link and which when the dies are brought together will weld and smoothly finish the outer side of the end of the link, while the pin or core welds and finishes the inner side of link end.

The rear faces of the lugs 4 and 5 are beveled, as shown, and the contiguous faces of the portion of the hammer-die are likewise beveled to match, this construction aiding in bringing the hammers together and prevents sticking and hanging of the members.

As hereinbefore stated, the form of the invention herein shown is adapted more particularly for use in connection with hammers giving a push stroke or blow and in which the pivotal point of the hammer is below the level of the anvil-die, while the form of die shown in the patent before mentioned is adapted to hammers giving a vertical stroke and in which the pivotal point of the hammer is on a level with or above the anvil-die.

In practice when the scarfed ends of the link are lapped that end of the link is placed in position on the anvil-die. The hammer-die is then operated and strikes the link with a downward and forward motion. The wall of the groove in the hammer-die being deep where it strikes the outside curve in the link end gives the same a rounded smooth shape and at the same time forces the inside curve against the welding pin or core, which shapes the inside of the link end on its lower side, while the U-shaped groove in the lower face of the hammer-die finishes the upper side. In the process of welding the link is turned over on one side and then the other on the anvil-die to receive the blows from the hammer-die until the thorough welding and proper shape of the link are obtained.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A die for welding links, comprising a lower or anvil die member, having at one end a centrally-arranged upwardly-projecting welding pin or core, and means for holding and preventing the lateral spreading of a link while being welded, an upper hammer-die member, a centrally-disposed U-shaped groove, having a deep rear wall formed in the lower face of said hammer-die member, a cut-away portion formed on the front lower face of said hammer-die, whereby the same is adapted to conform with the shape of the upper face of said anvil-die member, substantially as and for the purpose set forth.

In testimony whereof I have hereunto set my hand in presence of two subscribing witnesses.

WILLIAM N. GOURLEY.

Witnesses:
DORA SURDOE BACHMAN,
J. L. BACHMAN.